Sept. 30, 1969     R. HAYDEN ET AL     3,470,531
SEQUENTIAL FLASHER SYSTEM
Filed April 14, 1967
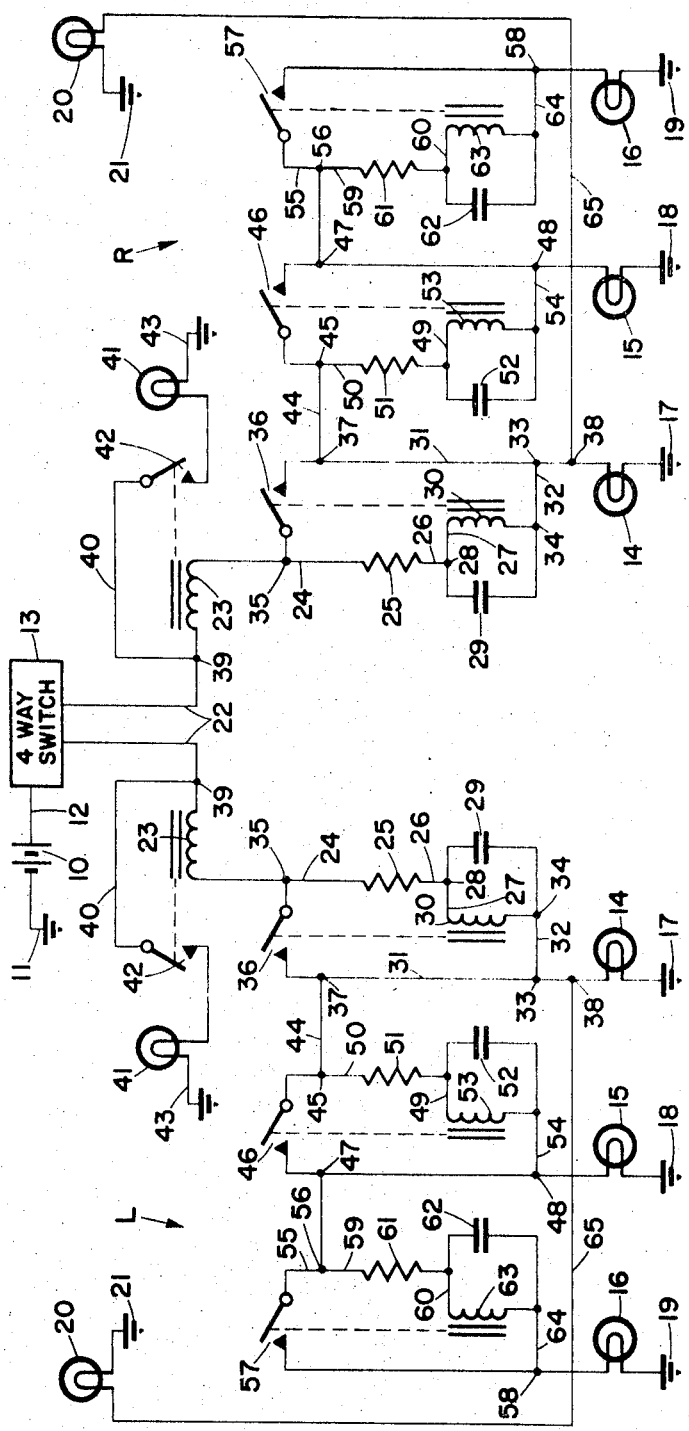
INVENTORS
RODNEY HAYDEN &
MARIO GUARASCI
BY *Philip E. Parker*

United States Patent Office 3,470,531
Patented Sept. 30, 1969

3,470,531
SEQUENTIAL FLASHER SYSTEM
Rodney Hayden, Stoney Creek, Ontario, and Mario Guarasci, Niagara Falls, Ontario, Canada, assignors to United-Carr Incorporated, Boston, Mass., a corporation of Delaware
Filed Apr. 14, 1967, Ser. No. 630,953
Claims priority, application Canada, Feb. 28, 1967, 983,942
Int. Cl. B60q 1/46
U.S. Cl. 340—82                              7 Claims

ABSTRACT OF THE DISCLOSURE

This is a flashing system for use in a motor vehicle for directional indicator purposes providing sequential illumination of multiple lights at either side of the rear of a vehicle at the same time as a front light on that side is illuminated.

Background of the invention

Conventional practice now dictates that at least one light at both the front and rear flash on the side of the automobile from which a turn is to be made. In accordance with later developments a plurality of lights, such as three, are located at each side of the vehicle rear. These lights flash simultaneously with the front light on that side and improved warning effects are achieved. However, it is believed that a still better warning is provided if the three lights flash in sequential order repeatedly.

Summary of the invention

Thus the present invention has in view, as a highly important object, the provision of a flashing system for motor vehicles which includes three lights at each side of the vehicle rear together with an electric system to operate the lights in sequence thereby providing a warning signal in the form of three sequentially flashing lights.

Another object in view is to provide a sequential flashing system of the type noted which avoids the use of any type of motor operated making and breaking device or solid state devices because of the high cost thereof.

Still another objective is to provide, in a motor vehicle, a sequential flashing system of the character aforesaid for each side of the vehicle and which system includes front flasher lights, together with a switching arrangement which permits the system on either side to be operated selectively, as occasion demands and which also provides for the simultaneous operation of the system on both sides to warn of a hazardous condition such as when a car is disabled at the side of a road.

Various other more detailed objects and advantages of the invention, such as arise in connection with carrying out the above noted ideas in a practical embodiment, will in part become apparent, and in part be hereinafter stated, as the description of the invention proceeds.

For a full and more complete understanding of the invention reference may be had to the following description and accompanying drawing.

Brief description of the drawing

The figure of the drawing is a wiring diagram of the system of this invention.

Description of the preferred embodiments

Referring now to the drawing wherein like reference characters denote corresponding parts it is first noted that while they are substantial duplicates the system for each side of the vehicle is illustrated. This is done to illustrate that either system is selectively operable, depending on the direction of turn to be made and yet both may be put into operation simultaneously as when a vehicle is disabled at the side of the road.

A power source is shown in the form of a battery 10 which ordinarily is the conventional twelve volt battery of a modern automobile. The battery 10 is grounded at one side to the chassis of the vehicle as indicated at 11, and from the other side a line 12 goes to a four-way switch indicated at 13. Switches of this type are now well known and available to the public as such. Hence the details thereof are not herein disclosed. It suffices to point out that the switch 13 has an off position, an on position for the system at each side and an on position for both sides.

The right hand system is identified in its entirety by the reference character R and the left hand system by L. The details of only one system are hereinafter described.

Thus referring to the right side system R an inboard rear light or load is shown at 14, a center rear light or load at 15, and an outboard rear light or load at 16. One side of each of the lights 14, 15, and 16 is grounded to the frame or chassis of the vehicle as indicated at 17, 18, and 19. A right front light is depicted at 20 and one side thereof is grounded at 21.

From the switch 13 a line 22 extends to a light-out indicator relay coil 23 and from the latter a line 24 goes to one end of a resistor 25. From the other end of the latter a line 26 is connected to a bus line 27 as at 28. One end of bus line 27 is connected to one side of a capacitor 29 and the other end to a relay coil assembly 30. The other end of the capacitor 29 is connected to a line 31 by a line 32 as indicated at terminal 33. The other end of the relay coil 30 is connected to line 32 at 34.

A by-pass line 31 extends from a junction point on the line 24 between relay 23 and resistor 25, as shown at 35 to the lamp or load 14 and includes a relay contact assembly 36 for relay coil 30 and junction points 37 and 35. From a junction point 39 on line 22 between switch 13 and relay coil 23 a line 40 goes to a pilot light 41 with a relay contact 42 on one side of the light 41 and a grounded connection 43 on the other side.

From the junction 37 a line 44 goes to light or load 15 including a junction point 45, relay contacts 46 and junction point 47 and terminal 48. Junction point 45 is connected to a bus line 49 by a line 50 which includes a resistor 51. This resistor 51 for the circuit of light 15 is of less magnitude than the resistor 25 for the circuit of light 14. One end of bus line 49 is connected to one side of a capacitor 52 while the other end of bus line 49 is connected to one side of a relay coil 53. The other side of capacitor 52 and the other end of relay coil 53 are connected to terminal 48 by a line 54. The different RC constants of the different light circuits may be determined by different values of the resistors or the capacitors or both.

From the junction point 47 a line 55 goes to light or load 16 and includes a junction point at 56, and relay contacts at 57 and terminal 58. From the junction 56 a line 59 goes to a bus line 60 and includes a resistor 61. This resistor 61 is of a lesser magnitude than the resistor for the circuit of light 15. One end of bus line 60 is connected to one side of a capacitor 62 and the other end to one end of a relay coil 63. A line 64 connects the other side of capacitor 62 and the other end of relay coil 63 to the junction point 58.

A line 65 connects the junction point 38 with the front lamp 20.

OPERATION

With the switch 13 turned on for the system R current flows through the relay coil 23 and the resistor 25 and will start to charge the capacitor 29. It will be noted that in this condition the relay coil 30 is short circuited by the capacitor 29 and no current will flow therethrough.

As the capacitor 29 begins to charge voltage will be generated on the positive side thereof and current will start to flow through the coil 30. When operating voltage is achieved for the capacitor 29, resistor 25 and relay coil 30 at which point the pull-in or actuating voltage of coil 30 is achieved, relay contacts 36 close and current is delivered to the lamp 14. When this occurs the resistor 25, capacitor 29 and relay coil 30 are short circuited.

Although relay coil 30 is shorted out it will not drop out until the voltage across capacitor 29 lowers to the drop out voltage of relay coil 30.

At the time relay contacts 36 close, lighting the lamp 14, voltage is applied to the circuit embracing resistor 51, capacitor 52 and relay coil 53. The same action described above in connection with the circuit of resistor 25, capacitor 29 and relay coil 30, now takes place to close the relay contacts 46 and illuminate the light 15. As in the case of the circuit for the lamp 14 when the light 15 is illuminated the circuit of resistor 61, capacitor 62 and relay coil 63 operates to close contacts 57 and illuminate the light 16.

It is notable that when the lamp 14 is energized current will flow from the junction point 38 to the front lamp 20 which is illuminated for the same time period as is the lamp 14.

Because of the fact that resistor 25 is of greater resistance than is the resistor 51 the relay 30 will stay in longer than will the relay 53, likewise, as the resistor 51 has a greater resistance than the resistor 61 the relay 53 stays in longer than the relay 63. Even though relays 53 and 63 may stay in longer than relay 30 all lamps 14, 15, and 16 will be extinguished together due to severance of power by opening of relay switch 36, thus adjustment of the on period of each relay is not critical to the functioning of the sequential series.

Thus the operation may be summed up by noting that the inboard light 14 and front light 20 are first illuminated after which the center light 15 goes on and finally the outboard light 16. This completes a cycle of operation which is terminated by all the lights going off after which the cycle is continuously repeated for as long as the switch 13 is on for that system.

The pilot relay contacts 42 are closed when the currents for all four lights provide the operating magnitude for relay coil 23. It does not close until all four lamps are illuminated. When the relay contacts 42 close the pilot lamp 41 is illuminated to advise the operator that all four lamps are in operation.

In any of lamps 14, 15, 16, or 20 burns out there will be insufficient current through coil 23 to close contact 42 and energize indicators on light 41. Thus a failure of any one lamp in the sequential system is signalled to the operator.

While the loads at 14, 15 and 16 are shown as simple lights it will be understood that they are representative of light terminals which may lead through switches of various types. Thus any kind of load can be connected across each of the terminals 33, 48, and 58 which define the output of the particular circuit on one side to ground (chassis) on the other. Should the load fail for any reason, such as the burning out of a light, the remainder of the system will continue to function but the fact of load failure will be indicated by the signal 41.

We claim:

1. For use in a motor vehicle including a chassis and a battery grounded at one side to said chassis; a flasher system for one side of said vehicle, said system comprising: a front light, an inboard rear light, a center rear light and an outboard rear light, one side of each of said lights being grounded to said chassis; a circuit from the battery to the ungrounded side of one of said rear lights; said circuit including a resistor together with a capacitor and a relay coil in parallel between said resistor and light; and a line by-passing said resistor, capacitor and said relay coil, and including relay contacts, a second circuit between said by-pass line on the light side of said relay coil and another of said rear lights, said second circuit duplicating all the elements of the first circuit but in which the resistor has less resistance than the resistor of the first circuit; a third circuit connected to the by-pass line of said second circuit on the light side of the relay contacts therein and extending to the remainder of said rear lights, said third circuit duplicating all the elements of each of said first and second circuits but the resistor of which has less resistance than the resistor of said second circuit, and a connection between said front light and said first circuit adjacent to the point where the rear light is connected thereto, whereby said rear lights are caused to flash in sequence and the front light therewith.

2. The flasher system of claim 1 together with a pilot light that is grounded on one side to said chassis; and a connection between the other side of said pilot light and said battery, said connection including a relay and relay coil for completing the circuit to the pilot light when all of said front and rear lights are illuminated.

3. For use in a motor vehicle including a chassis, a battery grounded to said chassis, a front light, an inboard rear light, a center rear light, and an outboard rear light, all of said lights being grounded to said chassis; a flashing system for said lights, said system comprising: a first relay coil connected to said battery; a first circuit connecting said first relay coil to said inboard rear light and including a resistor, a capacitor and a second relay coil in parallel between said resistor and said inboard rear light, and a by-pass line connected to a junction point between said first relay coil and said resistor and extending to said inboard rear light, and a pair of relay contacts included in said by-pass line and operated by said second relay; a second circuit connected to said by-pass line between the relay contacts and inboard rear light and extending to said center rear light; said second circuit duplicating all the elements of the first circuit with the resistor of the first circuit having a greater resistance than the resistor of the second circuit; a third circuit connected to the by-pass line of the second circuit between the relay contacts therein and said center rear light and extending to said outboard rear light; said third circuit duplicating all the elements of each of said first and second circuits with the resistor of the second circuit having a greater resistance than the resistor of the third circuit; and a connection between said front light and the first circuit immediately adjacent to said inboard rear light.

4. The flasher system of claim 3 together with a pilot light grounded to said chassis and connected to said battery, and a pair of relay contacts operated by said first relay coil and included in said connection whereby the current to the pilot light is completed when all of said front and rear lights are illuminated.

5. The flasher system of claim 1 together with a duplicate flasher system for the other side of the vehicle and a switch for rendering said systems effective either separately or simultaneously.

6. The flasher system of claim 4 together with a duplicate system for the other side of the vehicle and a switch for rendering said systems operative either selectively or simultaneously.

7. For use in a motor vehicle including a chassis and a battery grounded at one side to said chassis; a flasher system comprising: a first load, a second load, and a third load, one side of each of said loads being grounded to said chassis; a first circuit connecting the undergrounded side of said first load to the battery; said circuit including a resistor together with a capacitor and a relay coil in parallel between said resistor and a terminal to which said first load is connected; and a line by-passing said resistor, capacitor and said relay coil, and including relay contacts; a second circuit between said by-pass line on the load side of said relay contacts and a terminal connected to the second load, said circuit duplicating all the elements of said first circuit but in which the resistor has less resistance than the resistor of the first circuit; and a third circuit connected by the by-pass line of said second circuit on the load side of the relay contacts therein and extending to a terminal connected to said third load, said third circuit duplicating all the elements of each of said first and second circuits but the resistor of which has less resistance than the resistor of said second circuit, whereby said loads are energized in repeated sequences.

References Cited
UNITED STATES PATENTS

| | | | |
|---|---|---|---|
| 2,075,841 | 4/1937 | Wertheimer | 340—342 |
| 2,835,880 | 5/1958 | Daws | 340—81 |
| 2,912,675 | 11/1959 | Habsburg-Lothringen et al. | 340—82 X |
| 3,225,343 | 12/1965 | Kratochvil | 340—82 X |

JOHN W. CALDWELL, Primary Examiner

KENNETH N. LEIMER, Assistant Examiner

U.S. Cl. X.R.

307—41; 340—251